(12) United States Patent
Wong et al.

(10) Patent No.: US 11,416,517 B2
(45) Date of Patent: *Aug. 16, 2022

(54) PARTITIONING DATA IN A CLUSTERED DATABASE ENVIRONMENT

(71) Applicant: Landis+Gyr Innovations, Inc., Alpharetta, GA (US)

(72) Inventors: Chet Chan Wong, Alpharetta, GA (US); Siva Suthram, Chaska, MN (US); Sachin Vijan, Noida (IN)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/082,504

(22) Filed: Oct. 28, 2020

(65) Prior Publication Data

US 2021/0042328 A1   Feb. 11, 2021

Related U.S. Application Data

(63) Continuation of application No. 15/925,257, filed on Mar. 19, 2018, now Pat. No. 10,860,614.

(51) Int. Cl.
*G06F 16/27* (2019.01)
*H04L 67/1008* (2022.01)
(Continued)

(52) U.S. Cl.
CPC .......... *G06F 16/278* (2019.01); *G06F 16/252* (2019.01); *G06F 16/27* (2019.01);
(Continued)

(58) Field of Classification Search
CPC ...... G06F 16/278; G06F 16/252; G06F 16/27; G06F 16/23; G06F 16/2365; G06F 16/288; H04L 67/1008; H04L 67/1002
See application file for complete search history.

(56) References Cited

U.S. PATENT DOCUMENTS

| | | |
|---|---|---|
| 8,046,694 B1 | 10/2011 | Lappas et al. |
| 8,959,222 B2 | 2/2015 | Arrowood et al. |

(Continued)

OTHER PUBLICATIONS

"Oracle® Data Provider for .NET", Developer's Guide, 11g Release 1, vol. 11, No. 1, available online at https://docs.oracle.com/cd/B28359_01/win.111/b28375/OracleConnectionClass.htm#CHDFJBAF, Jul. 2007, 1216 pages.

(Continued)

*Primary Examiner* — Dangelino N Gortayo
(74) *Attorney, Agent, or Firm* — Kilpatrick Townsend & Stockton LLP (57) ABSTRACT

A system can include a server, various application servers, various database servers, and a system database. The application servers can be divided into application server groups that each include an application server. The server receives data from a data source and the data includes a source identifier and a key identifier associated with the data source. The server determines a particular application server group that is associated with the data source based on the source identifier of the data source and transmits the data from the data source to an application server of the application server group. The application server determines a particular database server associated with the application server group and transmits the data to the database server, which determines a particular partition of a system database in which to store the data based on the key identifier of the data source.

20 Claims, 4 Drawing Sheets

(51) Int. Cl.
  *G06F 16/25* (2019.01)
  *G06F 16/23* (2019.01)
  *H04L 67/1001* (2022.01)
  *G06F 16/28* (2019.01)

(52) U.S. Cl.
  CPC .......... *H04L 67/1008* (2013.01); *G06F 16/23* (2019.01); *G06F 16/2365* (2019.01); *G06F 16/288* (2019.01); *H04L 67/1002* (2013.01)

(56) References Cited

U.S. PATENT DOCUMENTS

| | | | |
|---|---|---|---|
| 2012/0284296 A1 | 11/2012 | Arifuddin et al. | |
| 2015/0120224 A1 | 4/2015 | Siebel et al. | |
| 2015/0244782 A1* | 8/2015 | Shimizu | H04L 47/621 709/202 |
| 2015/0348171 A1* | 12/2015 | Vasantham | G06Q 30/0633 705/26.81 |
| 2016/0055248 A1* | 2/2016 | Goel | G06F 16/219 707/770 |
| 2016/0065660 A1 | 3/2016 | Miyata et al. | |
| 2017/0006135 A1* | 1/2017 | Siebel | H04L 67/20 |
| 2017/0046510 A1 | 2/2017 | Chen et al. | |
| 2018/0074724 A1 | 3/2018 | Tremblay et al. | |
| 2018/0203942 A1* | 7/2018 | Liu | G06F 16/90335 |
| 2018/0329931 A1* | 11/2018 | Baid | G06F 8/60 |
| 2019/0238653 A1 | 8/2019 | Syomichev et al. | |

OTHER PUBLICATIONS

U.S. Appl. No. 15/925,257, Non-Final Office Action, dated Mar. 9, 2020, 16 pages.
U.S. Appl. No. 15/925,257, Notice of Allowance, dated Jul. 30, 2020, 10 pages.
Hu, "Global Scale Web 2.0 Data Platforms Sharding with Oracle Database", Oracle Open World, available online at http://www.oracle.com/au/products/database/300461-132370.pdf, 43 pages.
Kharchenko, "The Art of Database Sharding", Collaborate 12, Independent Oracle User Group, Mandalay Bay Convention Center, available online at http://www.slideshare.net/maxymkharchenko/2012-369-kharchenko-ppr, Apr. 22-26, 2012, 41 pages.
International Patent Application No. PCT/US2019/021726, International Search Report and Written Opinion, dated Jun. 13, 2019, 14 pages.
Zugic, "Selecting a MongoDB Shard Key", available Online at http://web.archive.org/web/201406021623/http://goranzugic.wordpress.com/2014/05/29/selecting-a-mongodb-shard-key/?, May 29, 2014, pp. 1-4.

* cited by examiner

PARTITIONING DATA IN A CLUSTERED DATABASE ENVIRONMENT

CROSS-REFERENCE TO RELATED APPLICATIONS

This is a continuation of U.S. patent application Ser. No. 15/925,257 entitled "Partitioning Data in a Clustered Database Environment" filed Mar. 19, 2018 (allowed), the contents of which are incorporated herein by reference.

TECHNICAL FIELD

The present disclosure relates generally to data sharding. More specifically, but not by way of limitation, this disclosure relates to partitioning data in a clustered database environment, which can improve the scalability of the environment and performance of devices in the clustered database environment.

BACKGROUND

In a clustered database environment, various servers or other devices may access one or more datasets. In some existing clustered database environments, the servers or devices may share access to the datasets, which can cause various technical issues in the environment such as cluster wait or server contention events that can occur when one or more servers or other devices in the environment attempt to access the same dataset simultaneously.

In some existing clustered database environments, cluster wait or server contention events can prevent, delay, or otherwise impact the ability of one or more servers or devices in the environment to perform various operations such as by preventing a server from accessing or processing a dataset when another server is accessing or processing the same dataset. Preventing or delaying one or more of servers or devices from performing operations can waste network resources or the server or device's computing resources while the server or device is prevented or delayed from performing operations. Moreover, such technical problems in existing clustered database environments may be amplified on interconnect traffic in a high availability clustered database environment in which various servers or devices are communicatively connected, receive data in a random fashion (e.g., from a load balancer device), and may attempt to simultaneously access the same data. Furthermore, such technical problems in existing clustered database environments may prevent the environment from being scaled out (e.g., prevent the addition of additional database servers) or may be further amplified if the database environment is scaled out.

Thus, existing clustered database systems and methods present disadvantages such as, but not limited to, those discussed above and may be unable to manage or analyze large, complex data sets. For these and other reasons, improved techniques for managing data in a clustered database environment and improved clustered database systems are therefore desirable.

SUMMARY

Covered aspects of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Various examples of the present disclosure provide systems and methods for partitioning data in a clustered database environment, which can improve the scalability of the environment and performance of devices in the environment.

In one example, a system includes a server, a plurality of application server groups communicatively coupled to the server that include an application server, a plurality of database servers communicatively coupled to the plurality of application server groups, and a system database partitioned into a plurality of partitions. The server includes a processor and a non-transitory computer-readable medium communicatively coupled to the processor. The server is configured to receive data from a data source, the data comprising a source identifier and a key identifier associated with the data source. The processor is also configured to determine an application server group of the plurality of application server groups that is associated with the data source based on the source identifier associated with the data source. The processor is further configured to transmit the data from the data source to an application server of the application server group, wherein the application server is configured to determine a database server of the plurality of database servers that is associated with the application server group and transmit the data from the data source to the database server and wherein the database server is configured to determine a particular partition of the plurality of partitions of the system database that is associated with the data source based on the key identifier of the data source, the particular partition usable for storing data from the data source.

In another example, a method includes obtaining, by a server, data from a data source, the data comprising a source identifier and a key identifier associated with the data source. The method further includes determining, by the server, an application server group of a plurality of application server groups that is associated with the data source based on the source identifier of the data source. The method also includes transmitting, by the server, the data from the data source to an application server of the application server group. The method also includes determining, by the application server, a database server of a plurality of database servers associated with the application server group. The method also includes transmitting, by the application server, the data from the data source to the database server. The method also includes determining, by the database server and based on the key identifier of the data source, a particular partition of a plurality of partitions of a system database that is associated with the data source, wherein the particular partition is usable for storing data from the data source.

In another example, a method includes obtaining, by a server, data from a data source, the data comprising a source identifier and a key identifier associated with the data source. The method also includes determining, by the server, an application server group of a plurality of application server groups that is associated with the data source based on the source identifier associated with the data source. The method further includes transmitting, by the server, the data from the data source to an application server of the application server group. The method also includes determining, by the application server, a first database server of a plurality of database servers associated with the application server group. The method also includes detecting, by the application server, an error in the first database server associated with the application server group. The method also includes identifying, by the application server, a second database server of the plurality of database servers to receive data from the data source. The method also includes transmitting, by the application server, the data from the data source to the second database server of the plurality of database servers. The method also includes determining, by the second database server and based on the key identifier of the data source, a particular partition of a plurality of partitions of a system database that is associated with the data source, wherein the particular partition is usable for storing data from the data source.

The details of one or more aspects and examples are set forth in the accompanying drawings and the description below. Other features and aspects will become apparent from the description, the drawings, and the claims.

DETAILED DESCRIPTION

Certain aspects and features of the present disclosure relate to partitioning data in a clustered database environment, which can improve the scalability of the environment and the performance of devices in the environment. As described above, existing clustered database environments and systems may include various devices (e.g., servers, databases, etc.) that share access to one or more datasets, which can cause cluster wait or contention events that may occur when or more devices simultaneously attempt to access the same data set. Certain examples described herein address these issues by partitioning data in a clustered database environment based on an identifier of a data source such that data from a data source is consistently transmitted to, and processed by, a particular device (e.g., server or database) or group of devices, which can improve the scalability of the environment and performance of devices in the environment.

In one example, a clustered database environment or system includes a server, various application servers, various database servers, and a system database. In this example, the various application servers can be divided into groups (e.g., farms) and each group of application servers can be associated with (e.g., communicatively connected to) a particular database server. In some instances, a number of application server groups in the environment can be based on a number of database servers in the environment and a number of application servers in each group can be based on the number of application server groups. For instance, if the environment includes three database servers and twenty-four application servers, the application servers can be divided into three application server groups that each include eight application servers. In another example, each application server group can include any number of application servers. For instance, each application server group can include a different number of application servers.

Continuing with this example, the server can be communicatively coupled to one or more data sources and can receive data from the data sources. An example of a data source can include a meter device for measuring consumption of a resource, such as electricity, gas, water, etc. A data source may measure or receive (e.g., obtain) data, optionally store the data, and communicate the data to the server. The data can include information measured or received (e.g., obtained) by the data source, along with a source identifier or a key identifier associated with the data source. A source identifier associated with a data source can be an identifier that can be used to identify the data source and route data from the data source to a particular group of application servers, an application server, or a database server. As an example, a source identifier associated with a meter data source or device can be a meter identifier. A key identifier associated with a data source can be an identifier that can be used to route data from the data source to a particular portion or partition of the system database. As an example, if a data source is a meter device, a key identifier associated with the meter device can be a portion of a meter identifier of the meter device that corresponds to a particular partition of the system database.

The server can include a processor and a memory that includes a database (e.g., a lookup table) and the server can determine a particular route for data received from the various data sources. For instance, the processor can determine a routing identifier associated with a data source based on a source identifier of the data source using one or more formulas, algorithms, methods, etc. In another example, the processor can access the database to determine a routing identifier associated with a data source based on a source identifier associated with the data source. The routing identifier can be used to determine a particular route for data received from the data source. For instance, the database can include data indicating source identifiers associated with various data sources and a routing identifier associated with each source identifier. A routing identifier can indicate a particular group of application servers, an application server, or a database server associated with a data source. For instance, a routing identifier can be used to determine a particular group of application servers or a particular database server of the environment that can receive or process data from a data source. In this example, the server receives data from the data source, along with the source identifier associated with the data source and the processor of the server can determine a routing identifier associated with the source identifier of the data source. In this example, the server can transmit the data from the data source to the particular application server group associated with the data source, in response to determining the routing identifier associated with the data source.

In this example, an application server of the application server group associated with the data source can receive data from the server and process or analyze the data. The application server can then transmit the processed data to a particular database server associated with the application server group. The database server can include a processor and a memory that includes a database. The processor of the database server can access the database to route data received from the application server to a particular portion or partition of the system database. For instance, the system database can be partitioned (e.g., divided) based on key identifiers associated with various data sources. As an example, each portion or partition of the system database can be associated with a key identifier of a particular data source. In this example, the database of the database server can include data indicating key identifiers associated with various data sources and a portion of the system database associated with each key identifier. The database server can use the database to route data obtained from the data source to a particular portion of the system database that corresponds to the key identifier of the data source.

As an illustrative example, a gas meter measures or receives data and transmits the data to a server, along with a source identifier (e.g., a meter identifier) and a key identifier (e.g., the last two digits of the meter identifier) of the gas meter. The server can determine a routing identifier associated with the meter based on the meter's source identifier and use the routing identifier to determine a particular group of application servers that can process data from the gas meter and a particular database server associated with the group of application servers. An application server of the group of application servers can process the data from the gas meter device and transmit the processed data to the database server. The database server can use the key identifier of the gas meter device to determine a portion or partition of a system database in which to store the data. For instance, the system database is partitioned into various portions and each portion of the system database corresponds to a key identifier of a particular gas meter device. In this example, the database server transmits the data from the gas meter device to the system database to be stored in the portion of the system database associated with the key identifier of the gas meter device.

In this manner, data obtained from a data source can be routed to a particular group of application servers and database server, which can prevent other application servers or database servers in the clustered database environment that are not associated with or assigned to the data source from accessing or processing data from the data source. Furthermore, data from the data source can be stored in a particular portion of a system database. In some instances, routing data from one or more data sources as described herein can prevent various devices in a clustered database environment from sharing access to the same dataset, which can mitigate or eliminate cluster wait or contention issues in the clustered database environment and improve the scalability of the environment and the performance of devices in the environment.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Figure 1:
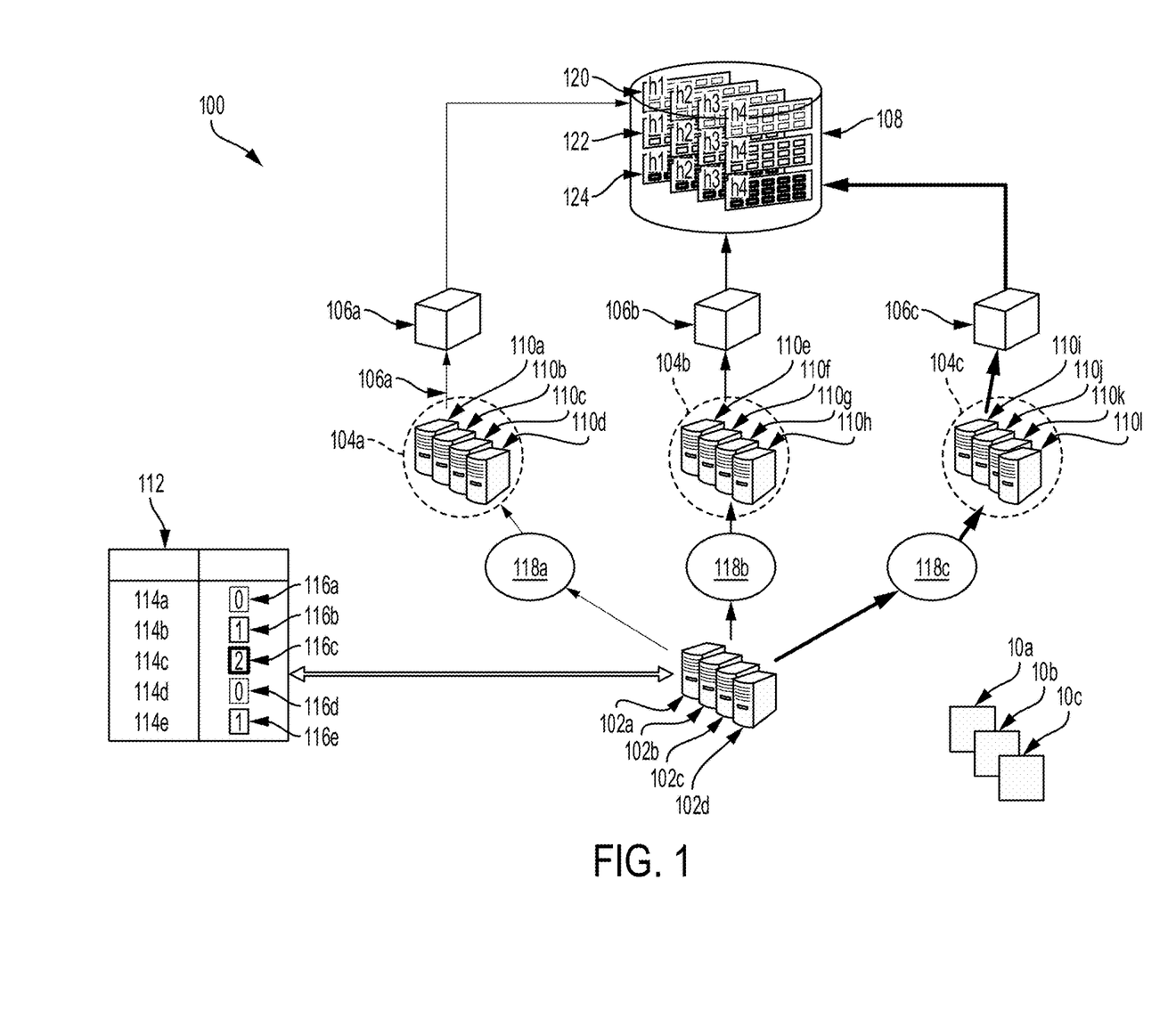
FIG. 1 is an example of a data partitioning system according to one example of the present disclosure.

FIG. 1 is an example of a data partitioning system 100 according to one example of the present disclosure. The system 100 can be any type of system in which data can be partitioned or sharded (e.g., a system for partitioning or dividing data among or within servers, databases, or devices). In some instances, the system 100 can be a clustered database system such as a system that includes various servers (e.g., nodes) that can perform various operations on data received by the system 100.

In the example depicted in FIG. 1, the system 100 includes one or more servers 102a-d, application server groups (e.g., farms) 104a-c, database servers 106a-c, and a system database 108. In this example, the application server groups 104a-c include various application servers 110a-1. Each server 102a-d, database server 106a-c, or application server 110a-1 can be any computing system (e.g., device) or storage device and can include one or more components. For example, each server 102a-d, database server 106a-c, or application server 110a-1 can include a processor, a bus, a database, a memory, input/output interface components, a display device, communication device, etc.

In some examples, a number of application server groups 104a-c in the system 100 can be based on a number of database servers 106a-c in the system 100 and each application server group 104a-c can be associated with (e.g., communicatively coupled to) a particular database server 106a-c. For instance, in the example depicted in FIG. 1, the system 100 includes three database servers 106a-c and three corresponding application server groups 104a-c associated with a particular database server 106a-c. In this example, the application server group 104a is communicatively coupled to the database server 106a, application server group 104b is communicatively coupled to the database server 106b, and application server group 104c is communicatively coupled to the database server 106c. In some examples, a number of application servers 110a-1 in each application server group 104a-c can be based on the number of application server groups 104a-c in the system 100. For instance, in the example depicted in FIG. 1, the system 100 includes twelve application servers 110a-1 and three application server groups 104a-c that each include four application servers. In another example, each application server group 104a-c can include any number of application servers 110a-1. For instance, each application server group 104a-c can include a different number of application servers 110a-1.

In some examples, one or more data sources 10a-c can be communicatively coupled to one or more devices or components of the system 100 (e.g., servers 102a-d). In another example, the data sources 10a-c can be communicatively coupled to one or more remote devices or servers. For example, the data sources 10a-c can be communicatively coupled to one or more other data sources, meter devices, network devices, etc. In some instances, the data sources 10a-c may communicate (e.g., transmit and receive data) with the one or more data sources, meter devices, or network devices via a wireless mesh network. Further, in some examples, a network device, such as collector device, may facilitate communication between the data sources 10a-c and one or more servers (e.g., the servers 102a-d).

In some examples, each server 102a-d can be communicatively coupled to one or more data sources 10a-c and can receive data from the data source. An example of a data source 10a-c can include a meter device for measuring consumption of a resource, such as electricity, gas, water, etc. A data source 10a-c may measure or receive (e.g., obtain) data, store the data, and communicate the data to a server 102a-d. The data can include information measured or received (e.g., obtained) by the data source 10a-c, along with a source identifier or a key identifier associated with the data source 10a-c. A source identifier can be any data or information that can be used to identify the data source 10a-c and route data from the data source 10a-c to a particular group of application server group 104a-c, application server 110a-1, or database server 106a-c. As an example, a source identifier of a meter data source or device can be a meter identifier. A key identifier of a data source 10a-c can be any data or information that can be used to route data from the data source 10a-c to a particular portion or partition of the system database 108. As an example, a key identifier of a meter device can be a portion of a meter identifier of the meter device that corresponds to a particular portion or partition of the system database 108.

Each server 102a-d can include a processor and a memory that includes a database (e.g., a lookup table). The processor can be communicatively coupled to the memory (e.g., via a bus). The memory of the server 102a-d can be any type of memory device that retains information when powered off. In some examples, a server 102a-d can receive data from a data source and the processor of the server 102a-d can determine a particular route for the data received from the data source. As an example, the processor of the server 102a can access the database to determine a particular route for the data received from the data source 10a-c. For instance, the database of the server 102a can include data indicating source identifiers associated with various data sources 10a-c and a routing identifier associated with each source identifier (e.g., in a lookup table 112). In some examples, the server 102a can obtain or receive data indicating the various source identifiers and routing identifiers (e.g., from another device or via user input). A routing identifier can indicate a particular application server group 104a-c, application server 110a-1, or database server 106a-c associated with a data source 10a-c (e.g., assigned to the data source to receive or process data from the data source). For example, in the example depicted in FIG. 1, each server 102a-d can include a lookup table 112 that includes data indicating various source identifiers 114a-e (e.g., various meter identifiers) and routing identifiers 116a-e (e.g., values or any other identifier) associated with each source identifier 114a-e. In this example, each routing identifier 116a-e indicates the particular application server group 104a-c or database server 106a-c assigned to each source identifier 114a-e to receive or process data from the data source 10a-c associated with each source identifier 104a-e. For example, routing identifiers 116a and 116d can indicate that source identifiers 114a and 114d are associated with (e.g., assigned to) application server group 104a and/or database server 106a, routing identifiers 116b and 116e can indicate that source identifiers 114b and 114e are associated with application server group 104b and/or database server 106b, and routing identifier 116c can indicate that source identifier 114c is associated with application server group 104c and/or database server 106c. Continuing with this example, the server 102a can receive data from the data source 10a-c, along with the source identifier 114a-e associated with the data source 10a-c and the processor of the server 102a can access the lookup table 112 to determine a routing identifier 116a-e associated with the source identifier. In this example, the server 102a can transmit data from the data source to the particular application server group 104a-c associated with the data source, in response to determining the routing identifier 116a-e associated with the data source.

While in the example described above, the lookup table 112 includes data indicating routing identifiers associated with various source identifiers and the processor of the servers 102a-d can access the lookup table 112 to determine a routing identifier associated with a source identifier of a data source 10a-c, the present disclosure is not limited to such configurations. Rather, in other examples, the processor of the servers 102a-d can determine a routing identifier associated with a data source 10a-c based on a source identifier of the data source 10a-c without accessing the lookup table 112. For instance, the sever 102a can receive data from a data source 10a-c, along with the source identifier 114a-e associated with the data source 10a-c and the processor of the server 102a can calculate or determine a routing identifier 116a-e associated the source identifier 114a-e and/or the data source 10a-c using one or more formulas, algorithms, methods, etc. Furthermore, while in the example described above, the servers 102a-d include the lookup table 112, the present disclosure is not limited to such configurations. Rather, in other examples, the lookup table 112 may be a part of the servers 102a-d or may be separate or remote from the servers 102a-d and the servers 102a-d can be communicatively coupled to the lookup table 112 to access the lookup table 112.

In some examples, the system 100 can include load balancer devices 118a-c. Each load balancer device 118a-c can be associated with a particular application server group 104a-c and communicatively coupled to the particular application server group 104a-c and the servers 102a-d. A load balancer device 118a-c can be any device configured to determine a particular application server 110a-1 within an application server group 104a-c to process or analyze data from a data source 10a-c associated with the application server group 104a-c.

For example, the processor of the servers 102a-d can receive data from a data source 10a-c and determine an application server group 104a-c associated with the data source 10a-c based on a routing identifier as described above. In this example, the memory of the servers 102a-d can include data indicating a load balancer device 118a-c associated with each application server group 104a-c and the processor of the servers 102a-d can access the memory to determine a particular load balancer 118a-c associated with the application server group 104a-c and transmit data obtained from the data source 10a-c to the particular load balancer device 118a-d. As an example, the server 102a obtains data from a data source 10a and determines that routing identifier 116a is associated with a source identifier 114a of the data source 10a. In this example, the server 102a can determine that the routing identifier 116a is associated with the application server group 104a. Continuing with this example, the server 102a can determine that a particular load balancer device 118a is associated with the application server group 104a and transmit the data to the load balancer device 118a. The load balancer device 118a can determine an application server 110a-d within the application server group 104a to process or analyze data from the data source 10a associated with the application server group 104a. In some instances, the load balancer devices 118a-c can determine a particular application server 110a-1 within an application server group 104a-c to process or analyze data from a data source 10a-c using various methods or techniques (e.g., in a random manner, based on an availability of an application server 110a-1 to process data, or any other suitable method or technique). For instance, the load balancer device 118 can determine that the application server 110a can process data from a data source 10a-c in response to determining that the application server 110a has available computing or network resources to process the data (e.g., if the application server 110a is not performing an operation). As another example, the load balancer device 118 can determine that the application server 110a can process data from a data source 10a-c in response to determining that the application server 110a has more computing or network resources available as compared to the other application servers 110b-d of the application server group 104a (e.g., if the other application servers 110b-d are performing more operations as compared to the application server 110a).

In some examples, the servers 102a-d may not communicate directly with the load balancer devices 118a-c. For instance, the processor of the servers 102a-d can receive data from a data source 10a-c and determine an application server group 104*a-c* associated with the data source 10*a-c* based on a routing identifier as described above. In this example, the processor of the servers 102*a-d* can transmit the data from the data source 10*a-c* to the application server group 104*a-c* associated with the data source 10*a-c*. A load balancer device 118*a-c* associated with the application server group 104*a-c* may receive (e.g., intercept) the data from the servers 102*a-d* and determine a particular application server 110*a*-1 within the application server group 104*a-c* associated with the load balancer device 118*a-c* to process or analyze data from the data source 10*a-c*. As an example, the server 102*a* obtains data from a data source 10*a* and determines that routing identifier 116*a* is associated with a source identifier 114*a* of the data source 10*a*. In this example, the server 102*a* can determine that the routing identifier 116*a* is associated with the application server group 104*a* and transmit the data from the data source 10*a* to the application server group 104*a*. Continuing with this example, the load balancer device 118*a* associated with the application server group 104*a* can receive (e.g., intercept) the data from the server 102*a* and determine an application server 110*a-d* within the application server group 104*a* to process or analyze the data from the data source 10*a* associated with the application server group 104*a*.

In some examples, the system 100 may not include load balancer devices 118*a-c*. In this example, the servers 102*a-d* can be configured to determine a particular application server 110*a*-1 within an application server group 104*a-c* to process or analyze data from a data source 10*a-c* associated with the application server group 104*a-c* in substantially the same manner as described above.

In some examples, the application servers 110*a*-1 can be communicatively coupled to the servers 102*a-d* or the load balancer devices 118*a-c* to receive data from the servers 102*a-d* or the load balancer device 118*a-c* and process or analyze the data. Each application server 110*a*-1 can also be communicatively coupled to a particular database server 106*a-c* associated with the application server group 104*a-c* of the application server 110*a*-1. For example, application servers 110*a-d* of application server group 104*a* can be associated with database server 106*a*, application servers 110*e-h* of the application server group 104*b* can be associated with database server 106*b*, and application servers 110*i*-1 of the application server group 104*c* can be associated with the database server 106*c*. The application servers 110*a*-1 can process data obtained or received from the servers 102*a-d* or the load balancer device 118*a-c* and transmit the processed data to a particular database server 106*a-c* associated with the application server group of the application server 110*a*-1.

For example, each application server 110*a*-1 can include a processor and a memory that includes a database. The database of the application server 110*a*-1 can include data indicating a particular database server 106*a-c* associated with the application server group 104*a-c* of the application server 110*a*-1. In some examples, the application server 110*a*-1 can process data obtained or received (e.g., via the load balancer device 118*a-c* or the servers 102*a-d*), determine a particular database server 106*a-c* associated with the application server group 104*a-c* of the application server 110*a*-1, and transmit the processed data to the particular application server group 104*a-c*. For instance, the application server 110*a* can process data received from the load balancer device 118*a* or the server 102*a*. The processor of the application server 110 can access a database of the application server 110*a* and determine that the database server 106*a* is associated with the application server group 104*a* of the application server 110*a*. The application server 110*a* can then transmit the processed data to the database server 106*a*.

Each database server 106*a-c* can be communicatively coupled to an application server 110*a*-1 of a particular application server group 104*a-c* associated with the database server 106*a-c*. The database servers 106*a-c* can include a processor and a memory that includes a database (e.g., a lookup table). The processor can be communicatively coupled to the memory (e.g., via a bus). The memory of the database server 106*a-c* can be any type of memory device that retains information when powered off. In some examples, a database server 106*a-c* can receive data from an application server 110*a*-1 associated with the database server 106*a-c* and the processor of the database server 106*a-c* can route data received from the application server 110*a*-1 to a particular portion or partition of the system database 108.

For example, the system database 108 can be partitioned (e.g., divided) based on key identifiers associated with various data sources 10*a-c*. As an example, the system database 108 can be partitioned into partitions (e.g., portions) 120, 122, 124 and each partition 120, 122, 124 can be associated with a key identifier of a particular data source 10*a-c*. For instance, in the example depicted in FIG. 1, partition 120 can be associated with the key identifier of the data source 10*a-c* corresponding to source identifier 114*a* such that data from the data source 10*a-c* is stored in the partition 120, partition 122 can be associated with the key identifier of the data source 10*a-c* corresponding to source identifier 114*b* such that data from the data source 10*a-c* is stored in the partition 122, and partition 124 can be associated with the key identifier of the data source 10*a-c* corresponding to source identifier 114*c* such that data from the data source 10*a-c* is stored in the partition 124. Thus, in some examples the system database 108 can be horizontally partitioned based on key identifiers associated with various data sources 10*a-c*.

In this example, the database of the database servers 106*a-c* can include data indicating key identifiers associated with various data sources and a portion of the system database 108 associated with (e.g., assigned to) each key identifier. In some examples, the database servers 106*a-c* can obtain (e.g., receive) data indicating key identifiers associated with various data sources 10*a-c* and a portion of the system database 108 associated with each key identifier from another device or via user input (e.g., from another device or via user input). The database servers 106*a-c* can use the database to route data obtained from a data source 10*a-c* (e.g., via a corresponding application server 110*a*-1) to a particular portion of the system database 108 that corresponds to the key identifier of the data source 10*a-c* such that the data can be stored in the particular portion of the system database 108. As an example, the database server 106*a* obtains data from the application server 110*a* that includes data from a data source 10*a-c* associated with source identifier 114*a*, along with the key identifier of the data source 10*a-c*. A processor of the database server 106*a* access a database of the database server 106*a* to determine the particular partition 120 of the system database 108 associated with the key identifier and transmits the data to the system database 108 to be stored in the partition 120 of the system database 108.

In another example, the processor of the database servers 106*a-c* can determine a key identifier associated with a data source 10*a-c* without accessing the database of the database servers 106*a-c* and use the determined key identifier to route data from the data source 10a-c to a particular portion or partition of the system database 108. For instance, the database server 106a obtains data from the application server 110a that includes data from a data source 10a-c associated with source identifier 114a. In this example, the processor of the database server 106a can determine a key identifier associated with the source identifier 114a without accessing a database of the database servers 106a-c. As an example, the source identifier 114a can be a meter identifier of a meter device data source 10a-c and the processor can use various algorithms, methods, or techniques to determine that the key identifier associated with the source identifier 114a is a portion of the meter identifier (e.g., the last two digits of the meter identifier). In this example, the processor of the database server 106a can use the determined key identifier to route data from the data source to a particular partition 120 of the system database 108 associated with the determined key identifier and transmit the data to the system database 108 to be stored in the partition 120.

In some examples, the system database 108 can additionally or alternatively be partitioned in any suitable manner. For example, the system database 108 can be additionally or alternatively partitioned based on a date, time, or any suitable interval. As an example, data stored in the system database 108 can be additionally partitioned based on a time that the data is obtained or received from a data source 10a-c such that data obtained from a data source 10a-c is stored in a particular partition of the system database 108, as described above, and the particular partition is further partitioned based on the time the data is received (e.g., data received from the data source 10a-c at a particular time can be stored within a sub-partition of the partition). Thus, in some examples, the system database 108 can be vertically partitioned based on any suitable criteria (e.g., based on a date or time) such that data from the particular data source 10a-c is further stored in a particular sub-partition of the partition. Accordingly, the system database 108 can be horizontally partitioned (based on key identifiers associated with various data sources 10a-c) and/or vertically partitioned (e.g., based on any suitable criteria).

In this manner, data obtained from various data sources 10a-c can be routed to a particular group of application servers 104a-c and database server 106a-c that can receive or process the data, which can prevent other groups of application servers 104a-c, application servers 110a-1, or database servers 106a-c that are not associated with or assigned to a data source 10a-c from accessing or processing data from the data source 10a-c. Furthermore, the data from the various data sources 10a-c can be processed by the various servers 102a-d, the load balancer devices 118a-c, application servers 110a-1, or database server 106a-c and stored in a particular portion of a single system database 108. Thus, in some instances, a single system database 108 can be used to store data from various disparate sources that can be processed by various servers or devices, which may obviate the use of multiple databases in the system 100. In some instances, routing data from one or more data sources 10a-c as described herein can prevent various devices in the system 100 (e.g., the application servers 110a-1 or database servers 106a-c) from sharing access to the same data (e.g., from the same data source) or simultaneously attempting to access the same data, which can mitigate or eliminate cluster wait or contention issues in the system 100. In some examples, mitigating or eliminating cluster wait or contention issues in the system 100 can prevent resources of the system 100 from being wasted, such as by preventing one or more application servers 110a-1, database servers 106a-c, or any other device in the system 100 from being prevented or delayed from performing operations on data obtained by the system 100.

In some examples, an error may occur in the system 100 (e.g., an error, failure, defect, etc. in one or more devices or components of the system 100). In this example, if an error occurs in the system 100, one or more components of the system 100 can be configured to determine an additional or alternative route for data obtained or received by the servers 102a-d. As an example, if a defect or an error occurs in the database server 106a, the application servers 110a-d associated with the database server 106a can be configured to determine an alternative route for data obtained or received by the application servers 110a-d.

Figure 4:
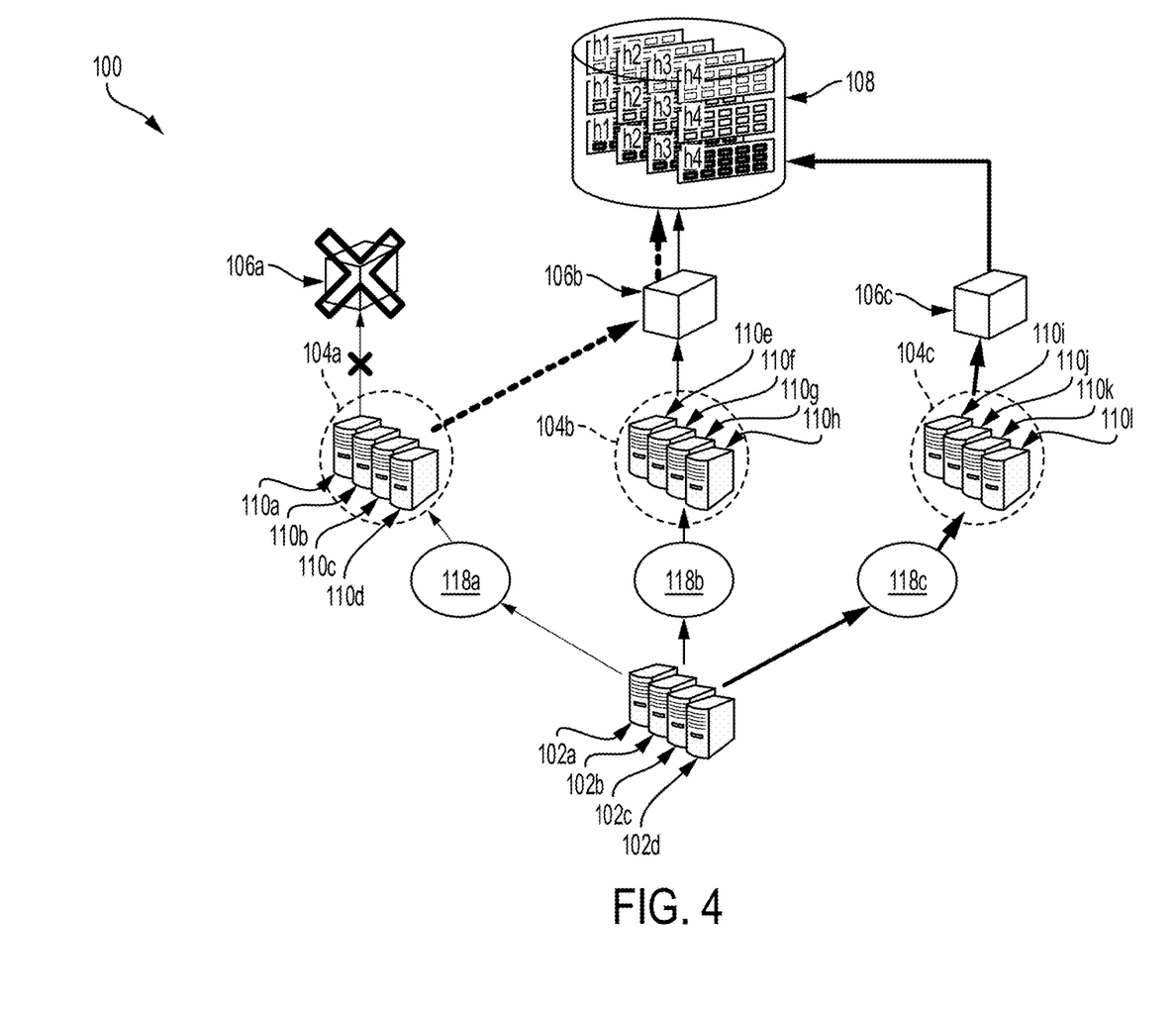
FIG. 4 is an example of a data partitioning system according to one example of the present disclosure.

For example, FIG. 4 is an example of a data partitioning system according to one example of the present disclosure. In the example depicted in FIG. 4, the application server 110a can receive data from the load balancer device 118a or server 102a and determine or detect that a defect (e.g., a failure) has occurred in the database server 106a. In this example, the application server 110a can determine or identify another database server 106b-c in the system 100 to receive or process the data. For instance, the application server 110a can determine that the database sever 106b is available to receive or process data and transmit the data obtained to the database server 106b instead of the database server 106a in response to determining that the defect has occurred in the database server 106a. The database server 106b can then determine a portion or partition of the system database 108 in which to store the data based on a key identifier of the data source 10a-c in substantially the same manner as described above. In this manner, data obtained or received by the system 100 can be re-routed if an error or defect occurs in one or more components of the system 100.

Returning to FIG. 1, although FIG. 1 illustrates a particular arrangement of the system 100, various additional arrangements are possible. As an example, while FIG. 1 illustrates a certain number of servers 102a-d, application server groups 104a-c, application servers 110a-1, database servers 106a-c, and system database 108, the present disclosure is not limited to such configurations. Rather, in other examples, the system 100 may include any suitable number or types of servers 102a-d, application server groups 104a-c, application servers 110a-1, database servers 106a-c, and system database 108. For instance, in some examples, the system 100 can be scaled out (e.g., scaled out to include additional application server groups, application servers, database servers, or system databases 108). Moreover, while in some examples described above, a data source 10a-c can transmit data indicating a source identifier or a key identifier associated with the data source 10a-c to one or more devices in the system 100, the present disclosure is not limited to such configurations. Rather, in other examples, a data source 10a-c can transmit data to one or more components of the system (e.g., servers 102a-d) and the data can include information measured or received (e.g., obtained) by the data source 10a-c, along with a source identifier associated with the data source 10a-c. In this example, one or more components of the system 100 (e.g., the servers 102a-d, application servers 110a-1, database servers 106a-c, load balancer devices 118a-c, or system database 108) can determine a key identifier associated with the data source 10a-c based on the source identifier. For instance, the server 102a obtains data from a data source 10a-c associated with the source identifier 114a. In this example, a processor of the server 102a can determine a key identifier associated with the source identifier 114a of the data source 10a-c. As an example, the source identifier 114a can be a meter identifier of a meter device data source 10a-c and the processor can determine that the key identifier associated with the source identifier 114a is a portion of the meter identifier (e.g., the last two digits of the meter identifier). In this example, the determined key identifier can be used to route data from the data source 10a-c to a particular partition of the system database 108 associated with the determined key identifier in substantially the same manner as described above. In some examples, using a meter identifier as a source identifier for determining a routing identifier or a key identifier can provide one or more advantages. For example, if the meter identifier is the source identifier of a data source 10a-c and the key identifier is a portion of the meter identifier, the data source 10a-c can transmit the measured data, along with data indicating the source identifier, to one or more components of the system 100 (e.g., the servers 102a-d, application servers 110a-1, database servers 106a-c, load balancer devices 118a-c, or system database 108). In this example, the one or more components can determine or identify a key identifier (e.g., the portion of the meter identifier) based on the source identifier (e.g., the meter identifier)

Furthermore, while in the examples described above, a routing identifier and/or a key identifier of a data source 10a-c can be determined based on a source identifier of the data source 10a-c, the present disclosure is not limited to such configurations. Rather, in other examples, a routing identifier and/or a key identifier of a data source 10a-c can be determined using any suitable method or technique.

Figure 2:
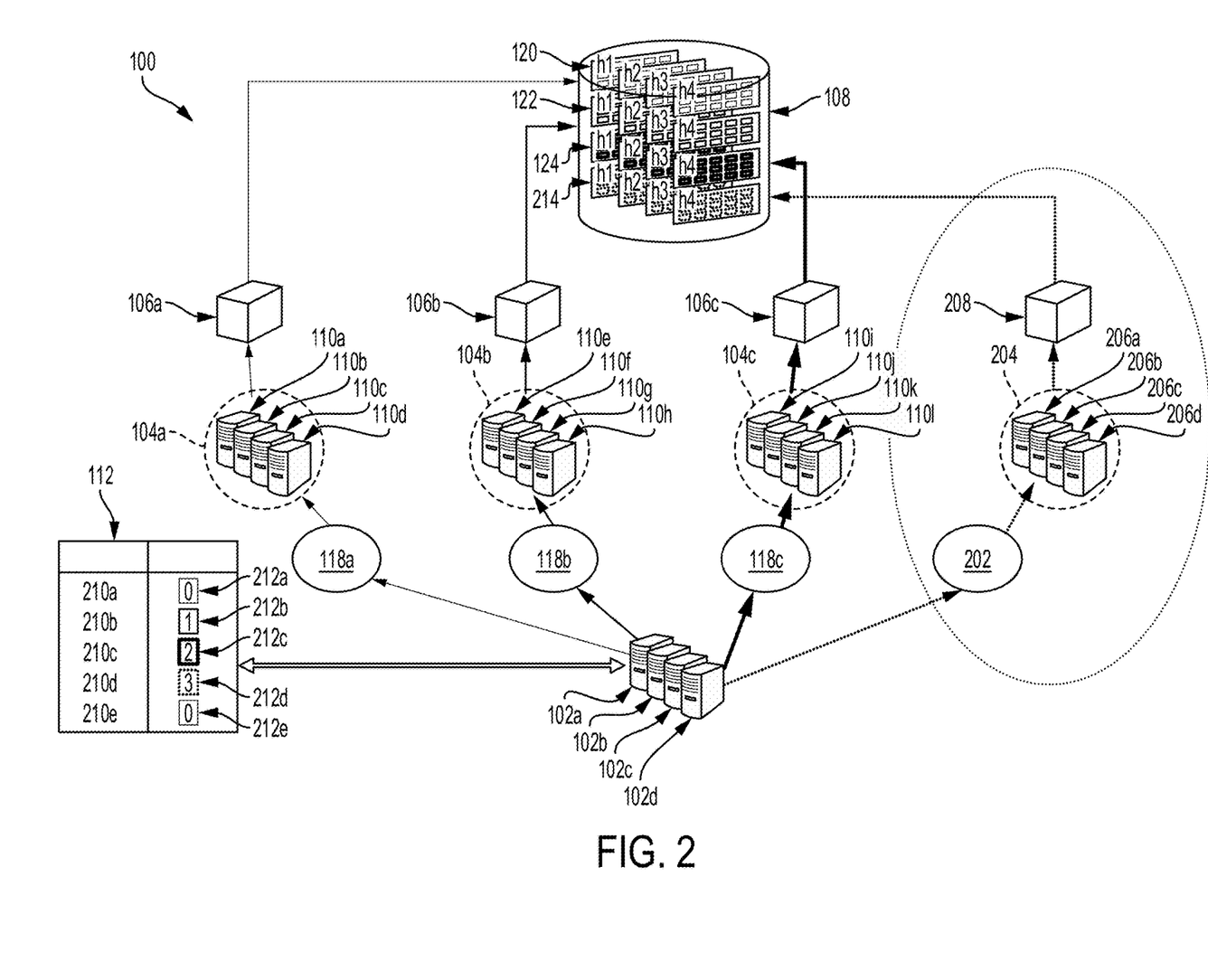
FIG. 2 is an example of a data partitioning system according to another example of the present disclosure.

For example, FIG. 2 is an example of a data partitioning system 200 according to another example of the present disclosure. In this example, the system 200 includes the servers 102a-d, application server groups 104a-c, application servers 110a-1, database servers 106a-c, load balancer devices 118a-c, and system database 108 of FIG. 1. In the example depicted in FIG. 2, the system 200 is scaled out to include additional load balancer device 202, application server group 204, application servers 206a-d, and database server 208 each of which can be configured in substantially the same manner as the load balancer device 118a-c, application server groups 104a-c, application servers 110a-1, and database servers 106a-c of FIG. 1, respectively.

In this example, the lookup table 112 of the servers 102a-d includes various source identifiers 210a-e (e.g., various meter identifiers) and routing identifiers 212a-e associated with each source identifier 210a-e and the lookup table 112 can be used to route data from a data source (e.g., data source 10a-c of FIG. 1) associated with a source identifier 210a-e to the load balancer devices 118a-c and 202, application server groups 118a-c and 204, application servers 110a-1 and 206a-d, and database servers 106a-c and 208 in substantially the same manner as described above. In some examples, the servers 102a-d can receive data indicating the source identifiers 210a-e and routing identifiers 212a-e (e.g., from another device or via user input) in response to the load balancer device 202, application server group 204, application servers 206a-d, or database server 208 being added to the system 100 of FIG. 1.

In this example, the system database 108 can be further partitioned based on a key identifier of one or more data sources such that data from the data source can be stored in a particular portion of the system database 108 in substantially the same manner as described above. For instance, the system database 108 can be further partitioned to include partition 214 such that data obtained from a data source associated with application server group 204 and database server 208 (e.g., a data source associated with source identifier 210d and routing identifier 212d) can be processed and stored in the partition 214 of the system database 108 in substantially the same manner as described above. In some examples, the system database 108 can be partitioned to include partition 214 or any other partition in response to scaling out the system 100 to include the load balancer device 202, application server group 204, application servers 206a-d, and database server 208.

In this manner, the system 100 can be scaled out to include additional or alternative components (e.g., load balancers, application server groups, application servers, database servers, etc.)

Figure 3:
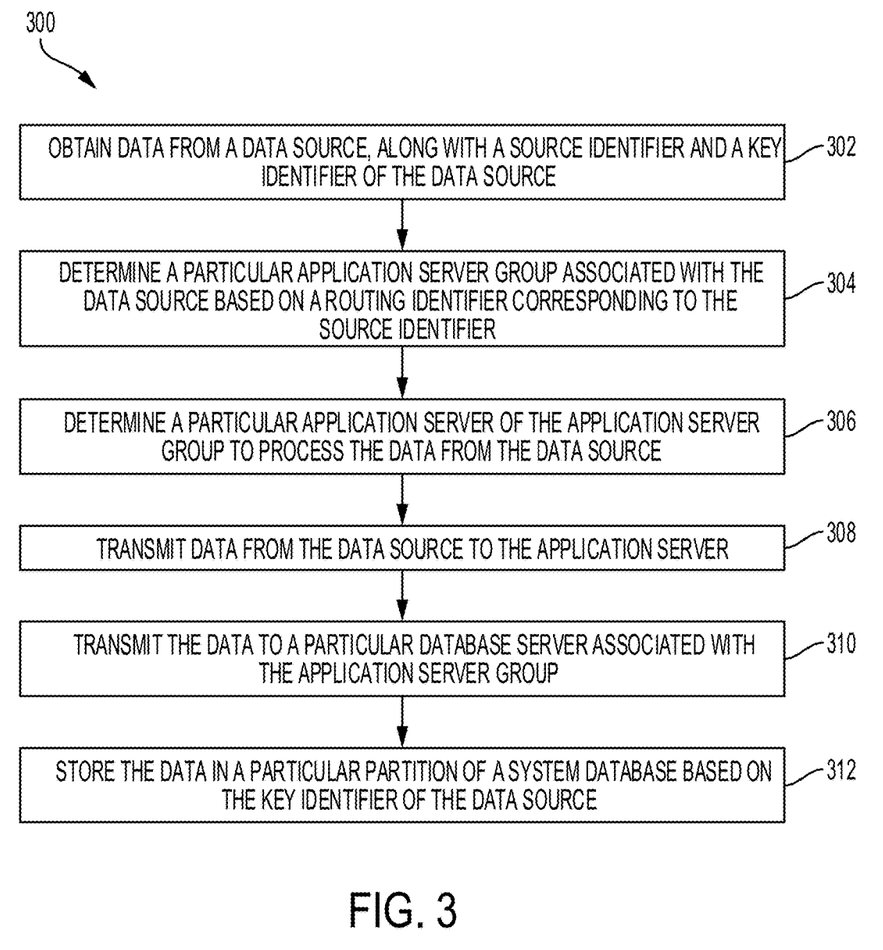
FIG. 3 is a flow chart depicting an example of a process for partitioning data in a clustered database environment according to one example of the present disclosure.

FIG. 3 is a flow chart depicting an example of a process for partitioning data in a clustered database environment according to one example of the present disclosure. In some examples, the steps in FIG. 3 may be implemented in program code that is executable by a processor, for example, the processor in a general-purpose computer or a server. In some examples, these steps may be implemented by a group of processors or servers. In some examples, one or more steps shown in FIG. 3 may be omitted or performed in a different order. Similarly, in some examples, additional steps not shown in FIG. 3 may also be performed. The process 300 of FIG. 3 is described with reference to FIG. 1, but other implementations are possible.

In block 302, data is obtained from a data source 10a-c, along with a source identifier and key identifier of the data source 10a-c. The data source 10a-c can be any data source. For instance, the data source 10a-c can be a meter device for measuring consumption of a resource, such as electricity, gas, water, etc. The data source 10a-c may measure or receive (e.g., obtain) data, store the data, and communicate the data to a server 102a-d. The data can include information measured or received (e.g., obtained) by the data source 10a-c, along with a source identifier or a key identifier associated with the data source 10a-c. As an example, the data source 10a is a water meter device and the server 102a obtains data measured or received by the meter device, along with data indicating a meter device identifier of the water meter device and a particular portion of the meter identifier (e.g., the last two digits of the meter device identifier).

In block 304, a particular application server group 104a-c associated with the data source 10a-c is determined based on a routing identifier that corresponds to the source identifier of the data source 10a-c.

For example, various application server groups 104a-c can include various application servers 110a-1. Each application server group 104a-c can be associated with (e.g., assigned to) a particular routing identifier. In some examples, the server 102a includes a processor and a memory that includes a database or lookup table 112. The lookup table 112 of the server 102a can include data indicating source identifiers 114a-e associated with various data sources 10a-c and a routing identifier 116a-e associated with each source identifier 114a-e. Each routing identifier 116a-e indicates a particular application server group 104a-c, application server 110a-1, or database server 106a-c assigned to each source identifier 114a-e. The server 102a can receive data from the data source 10a-c, along with the source identifier 114a-e associated with the data source 10a-c and the processor of the server 102a can access the lookup table 112 to determine a routing identifier 116a-e associated with the source identifier 114a-e. As an example, the server 102a receives data from a data source 10a corresponding to source identifier 114a and determines that routing identifier 116a is associated with source identifier 114a based on the lookup table 112. In this example, the server 102*a* can determine that the routing identifier 116*a* is associated with (e.g., assigned to) application server group 104*a*.

In another example, in block 304, the processor of the servers 102*a-d* can determine a routing identifier associated with a data source 10*a-c* based on a source identifier of the data source 10*a-c* without accessing the lookup table 112. For instance, the sever 102*a* can receive data from a data source 10*a-c*, along with the source identifier 114*a-e* associated with the data source 10*a-c* and the processor of the server 102*a* can calculate or determine a routing identifier 116*a-e* associated with the source identifier 114*a-e* and/or the data source 10*a-c* using the following formula:

Routing Identifier=(Source Identifier % 100)% *n*

In the equation above, % represents a modulo operation or function (e.g., a determination of a remainder after division of one number by another) and n represents a number of database servers 110*a*-1 in the system 100.

In block 306, a particular application server 110*a*-1 of the application group 104*a-c* that can process the data from the data source 10*a-c* is determined. For example, each server 102*a-d* can transmit data obtained from a data source 10*a-c* to a load balancer device 118*a-c*. Each load balancer device 118*a-c* can be associated with a particular application server group 104*a-c* and communicatively coupled to the particular application server group 104*a-c* and the servers 102*a-d*. The load balancer device 118*a-c* can determine a particular application server 110*a*-1 within an application server group 104*a-c* to process or analyze data from a data source 10*a-c* associated with the application server group 104*a-c*. For example, the load balancer device 118*a* can be associated with the application server group 104*a* and can receive data from the server 102*a*. The load balancer device 118*a* can determine an application server 110*a-d* within the application server group 104*a* to process or analyze data from a data source 10*a-c* associated with the application server group 104*a*. In some instances, the load balancer devices 118*a-c* can determine a particular application server 110*a*-1 within an application server group 104*a-c* to process or analyze data from a data source 10*a-c* using various methods or techniques (e.g., in a random manner, based on an availability of an application server 110*a*-1 to process data, or any other suitable method or technique). For instance, the load balancer device 118*a* can determine that the application server 110*a* can process data from a data source 10*a* in response to determining that the application server 110*a* has available computing or network resources to process the data (e.g., if the application server 110*a* is not performing an operation). As another example, the load balancer device 118*a* can determine that the application server 110*a* can process data from a data source 10*a* in response to determining that the application server 110*a* has more computing or network resources available as compared to the other application servers 110*b-d* of the application server group 104*a* (e.g., if the other application servers 110*b-d* are performing more operations as compared to the application server 110*a*).

In some examples, the system 100 may not include load balancer devices 118*a-c*. In this example, in block 306, the servers 102*a-d* can determine a particular application server 110*a*-1 within an application server group 104*a-c* to process or analyze data from a data source 10*a-c* associated with the application server group 104*a-c* in substantially the same manner as described above.

In block 308, data obtained from the data source 10*a-c* is transmitted to the application server 110*a-d* of the application server group 104*a-c* (e.g., the application server group determined in block 304). In some examples, the servers 102*a-d* can be communicatively coupled to the application server groups 104*a-c* to transmit data obtained from the data source 10*a-c* to the application server groups 104*a-c* or an application server 110*a*-1 of the application server group 104*a-c*. For example, the server 102*a-d* can transmit data obtained from the data source 10*a-c* to the application server 110*a*-1 determined by a load balancer device 118*a-c* (e.g., in block 306). In another example, the server 102*a-d* can transmit data obtained from the data source 10*a-c* to any application server 110*a*-1 of the application server group 104*a-c* associated with the routing identifier 116*a-e* that corresponds to the source identifier 114*a-e* of the data source 10*a-c* (e.g., the application server group determined in block 304). In some examples, the server 102*a-d* can be communicatively coupled to a particular load balancer 118*a-c* associated with the application server group 104*a-c* and the load balancer 118*a-c* can transmit the data to the application server group 104*a-c* or an application server 110*a*-1 of the application server group 104*a-c*.

As an example, the server 102*a* receives data from a data source 10*a* corresponding to source identifier 114*a* and determines that routing identifier 116*a* is associated with source identifier 114*a* based on the lookup table 112. In this example, the server 102*a* can determine that the routing identifier 116*a* is associated with (e.g., assigned to) application server group 104*a*. Continuing with this example, the server 102*a* can transmit data from the data source 10*a* to the particular application server group 104*a* associated with the data source 10*a* or an application server 110*a-d* of the application server group 104*a*. As another example, the server 102*a* can transmit the data to the particular load balancer device 118*a* associated with the application server group 104*a* and the load balancer device 118*a* can transmit the data to the application server group 104*a* or a particular application server 110*a-d* of the application server group 104*a* (e.g., the particular application server determined in block 306).

In some examples, in block 308, the application servers 110*a*-1 of the particular application server group 104*a-c* can process data obtained or received from the servers 102*a-d* or the load balancer device 118*a-c*.

In block 310, the data is transmitted to a particular database server 106*a-c* associated with the application server group 104*a-c*. For example, each database server 106*a-c* can be associated with a particular application server group 104*a-c*. As an example, and with reference to FIG. 1, database server 106*a* can be associated with application server group 104*a*, database server 106*b* can be associated with application server group 104*b*, and database server 106*c* can be associated with application server group 104*c*. The application servers 110*a*-1 of a particular application sever group (e.g., the application server group determined in block 304) can process data obtained or received from the servers 102*a-d* or the load balancer device 118*a-c* (e.g., in block 308) and transmit the processed data to a particular database server 106*a-c* associated with the application server group 104*a-c* of the application server 110*a*-1. As an example, the application server 110*a* can process data received from the load balancer device 118*a* or the server 102*a* and transmit the processed data to the database server 106*a* that is associated with the application server group 104*a* of the application server 110*a*.

In block 312, the data from the data source 10*a-c* is stored in a particular partition of a system database 108 based on the key identifier of the data source 10*a-c*.

For example, each database server 106a-c can include a processor and a memory that includes a database. The database server 106a-c can receive data from an application server 110a-1 associated with the database server 106a-c (e.g., in block 310) and the processor of the database server 106a-c can access the database to route data received from the application server 110a-1 to a particular portion or partition of the system database 108.

As an example, the system database 108 can be partitioned (e.g., divided) based on key identifiers associated with various data sources 10a-c. For example, the system database 108 can be partitioned into partitions (e.g., portions) 120, 122, 124 and each partition 120, 122, 124 can be associated with a key identifier of a particular data source 10a-c. For instance, partition 120 can be associated with the key identifier of the data source 10a corresponding to source identifier 114a, partition 122 can be associated with the key identifier of the data source 10b corresponding to source identifier 114b, and partition 124 can be associated with the key identifier of the data source 10c corresponding to source identifier 114c. In this example, the database of the database servers 106a-c can include data indicating key identifiers associated with various data sources 10a-c and a portion of the system database 108 associated with (e.g., assigned to) each key identifier. The database servers 106a-c can use the database to route data obtained from a data source 10a-c (e.g., via a corresponding application server 110a-1) to a particular portion of the system database 108 that corresponds to the key identifier of the data source 10a-c. As an example, the database server 106a obtains data from the application server 110a that includes data from a data source 10a associated with source identifier 114a, along with the key identifier of the data source 10a. A processor of the database server 106a access a database of the database server 106a to determine the particular partition 120 of the system database 108 associated with the key identifier and transmits the data to the system database 108 to be stored in the partition 120 of the system database 108.

While in this example, the system database 108 can be partitioned based on key identifiers associated with various data sources 10a-c, the present disclosure is not limited to such configurations. Rather, in other examples, the system database 108 can additionally or alternatively be partitioned in any suitable manner and the database servers 106a-c can be configured to transmit data to the system database 108 to be stored in a particular partition of the system database 108. For example, the system database 108 can be partitioned based on a date, time, or any suitable interval and the database servers 106a-c can be configured to transmit data to the system database 108 to be stored in a particular partition of the system database 108 based on a particular date, time, or interval. As an example, data stored in the system database 108 can be additionally partitioned based on days in a month and the database servers 106a-c can be configured to transmit data to the system database 108 to be stored based on the partitions such that data obtained from a data source 10a-c is stored in a particular partition of the system database 108 associated with a key identifier of the data source 10a-c, as described above, and the particular partition is further partitioned based on the day of the month that the data is received (e.g., data received from the data source 10a-c on a particular day can be stored within a sub-partition of the partition). As another example, data transmitted or stored in the system database 108 can be additionally or alternatively partitioned based on any suitable criteria such as a type, content, characteristic, etc. of the content from the data source 10a-c.

While in the examples described above, data from a data source can be routed and partitioned based on a source identifier, routing identifier, or a key identifier associated with a data source, the present disclosure is not limited to such configurations. Rather, in other examples, data from a data source may be routed to a particular server, load balancer device, group of application servers, and/or database server based on a source identifier, routing identifier, or a key identifier associated with a data source. In an alternative example, data from a data source can be stored in a particular partition or sub-partition of a system database based on a source identifier, routing identifier, or a key identifier associated with the data source.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a server;
   a plurality of application server groups communicatively coupled to the server, wherein each application server group comprises an application server;
   a plurality of database servers communicatively coupled to the plurality of application server groups, wherein a number of the plurality of database servers equals a number of the plurality of application server groups, and each of the plurality of application server groups corresponds to and is communicatively connected to one database server among the plurality of database servers; and
   a system database partitioned into a plurality of partitions and communicatively coupled to the plurality of database servers,
   wherein the server comprises:
   a processor; and
   a non-transitory computer-readable medium communicatively coupled to the processor, wherein the processor is configured to perform operations comprising:
   receiving data from a data source, the data comprising a source identifier associated with the data source;
   determining an application server group among the plurality of application server groups that is associated with the data source based on a routing identifier corresponding to the source identifier associated with the data source, wherein the routing identifier indicates the application server group among the plurality of application server groups that is associated with the data source and used to receive or process the data from the data source; and
   transmitting the data from the data source to an application server of the application server group,
   wherein the application server is configured to determine a database server of the plurality of database servers that corresponds to the application server group and transmit the data from the data source to the database server, and
   wherein the database server is configured to have data from the data source stored in the system database.

2. The system of claim 1, further comprising:
   a plurality of load balancer devices communicatively coupled to the server and the plurality of application server groups, wherein the processor is further configured to determine a load balancer device of the plurality of load balancer devices that is associated with the application server group and wherein the load balancer device is configured to:
  determine the application server of the application server group for processing the data from the data source; and
  transmit the data from the data source to the application server.

3. The system of claim 1, wherein the routing identifier is obtained from a database comprising a plurality of routing identifiers corresponding to a plurality of source identifiers, wherein each routing identifier indicates an application server group among the plurality of application server groups that is associated with a data source identified by a source identifier of the plurality of the source identifiers and used to receive or process data from the data source.

4. The system of claim 1, wherein having data from the data source stored in the system database comprises:
  accessing a plurality of key identifiers corresponding to the plurality of partitions of the system database;
  determining a particular partition of the system database corresponding to the data source based on a key identifier associated with the data source and the plurality of key identifiers; and
  transmitting the data from the data source to the system database for storage in the particular partition.

5. The system of claim 1, wherein the application server of the application server group is further configured to:
  detect an error in the database server corresponding to the application server group;
  identify another database server of the plurality of database servers to receive data from the data source; and
  transmit the data from the data source to the identified another database server of the plurality of database servers.

6. The system of claim 1, wherein the data source comprises a meter device for measuring consumption of a resource.

7. The system of claim 6, wherein the resource comprises electricity, gas, or water.

8. A method comprising:
  obtaining, by a server, data from a data source, the data comprising a source identifier associated with the data source;
  determining, by the server, an application server group among a plurality of application server groups that is associated with the data source based on a routing identifier corresponding to the source identifier of the data source, wherein the routing identifier indicates the application server group among the plurality of application server groups that is associated with the data source and used to receive or process the data from the data source;
  transmitting, by the server, the data from the data source to an application server of the application server group;
  determining, by the application server, a database server of a plurality of database servers that corresponds to the application server group, wherein a number of the plurality of database servers equals a number of the plurality of application server groups, and each of the plurality of application server groups corresponds to and is communicatively connected to one database server among the plurality of database servers;
  transmitting, by the application server, the data from the data source to the database server; and
  causing, by the database server, data from the data source to be stored on a system database.

9. The method of claim 8, wherein causing data from the data source to be stored on the system database comprises:
  determining, by the database server, a key identifier associated with the data source based on the source identifier of the data source; and
  determining, by the database server and based on the key identifier of the data source, a particular partition of a plurality of partitions of the system database that is associated with the data source, wherein the particular partition is usable for storing data from the data source; and
  transmitting, by the database server, the data from the data source to the system database for storage in the particular partition.

10. The method of claim 9, wherein determining the particular partition of the plurality of partitions of the system database that is associated with the data source comprises:
  accessing, by the database server, a database comprising a plurality of key identifiers corresponding to the plurality of partitions of the system database;
  determining, by the database server, the particular partition of the system database corresponding to the key identifier of the data source; and
  transmitting, by the database server, the data from the data source to the system database for storage in the particular partition.

11. The method of claim 8, wherein transmitting the data from the data source to the application server of the application server group comprises:
  determining, by the server, a load balancer device of a plurality of load balancer devices that is associated with the application server group;
  transmitting, by the server, the data from the data source to the load balancer device;
  determining, by the load balancer device, the application server of the application server group for processing the data from the data source; and
  transmitting, by the load balancer device, the data from the data source to the application server.

12. The method of claim 8, wherein the routing identifier is obtained from a database comprising a plurality of routing identifiers corresponding to a plurality of source identifiers, wherein each routing identifier indicates an application server group among the plurality of application server groups that is associated with a data source identified by a source identifier of the plurality of the source identifiers and used to receive or process data from the data source.

13. The method of claim 8, further comprising:
  detecting, by the application server of the application server group, an error in the database server corresponding to the application server group;
  identifying, by the application server, another database server of the plurality of database servers to receive data from the data source; and
  transmitting, by the application server, the data from the data source to the identified another database server of the plurality of database servers.

14. The method of claim 8, wherein the data source comprises a meter device for measuring consumption of a resource.

15. A method comprising:
  obtaining, by a server, data from a data source, the data comprising a source identifier associated with the data source;
  determining, by the server, an application server group of a plurality of application server groups that is associated with the data source based on a routing identifier corresponding to the source identifier associated with the data source, wherein the routing identifier indicates the application server group among the plurality of application server groups that is associated with the data source and used to receive or process the data from the data source;

transmitting, by the server, the data from the data source to an application server of the application server group;

determining, by the application server, a first database server of a plurality of database servers that corresponds to the application server group, wherein a number of the plurality of database servers equals a number of the plurality of application server groups, and each of the plurality of application server groups corresponds to and is communicatively connected to one database server among the plurality of database servers;

detecting, by the application server, an error in the first database server corresponding to the application server group;

identifying, by the application server, a second database server of the plurality of database servers to receive data from the data source;

transmitting, by the application server, the data from the data source to the second database server of the plurality of database servers; and causing, by the second database server, the data from the data source to be stored on a system database.

16. The method of claim 15, wherein transmitting the data from the data source to the application server of the application server group comprises:

determining, by the server, a load balancer device of a plurality of load balancer devices that is associated with the application server group;

transmitting, by the server, the data from the data source to the load balancer device;

determining, by the load balancer device, the application server of the application server group for processing the data from the data source; and transmitting, by the load balancer device, the data from the data source to the application server.

17. The method of claim 16, wherein determining the application server of the application server group for processing the data from the data source comprises determining, by the load balancer device, the application server for processing the data from the data source based on an availability of the application server to process the data.

18. The method of claim 15, wherein causing, by the second database server, the data from the data source to be stored on the system database comprises:

determining, by the second database server, a key identifier associated with the data source based on the source identifier;

accessing, by the second database server, a plurality of key identifiers corresponding to a plurality of partitions of the system database;

determining, by the second database server, a particular partition of the plurality of partitions of the system database corresponding to the key identifier of the data source; and transmitting, by the second database server, the data from the data source to the system database for storage in the particular partition.

19. The method of claim 15, wherein the routing identifier is obtained from a database comprising a plurality of routing identifiers corresponding to a plurality of source identifiers, wherein each routing identifier indicates an application server group among the plurality of application server groups that is associated with a data source identified by a source identifier of the plurality of the source identifiers and used to receive or process data from the data source.

20. The method of claim 15, wherein the data source comprises a meter device for measuring consumption of a resource.

* * * * *